(12) United States Patent
Rajendra et al.

(10) Patent No.: US 12,306,030 B2
(45) Date of Patent: May 20, 2025

(54) SENSOR ASSEMBLY

(71) Applicants: Tyco Electronics (Shanghai) Co. Ltd., Shanghai (CN); TE Connectivity Services GmbH, Schaffhausen (CH)

(72) Inventors: Pai Rajendra, Shanghai (CN); Tian Xia, Shanghai (CN); Lei Pan, Shanghai (CN); Stephen Descioli, Louisville, KY (US)

(73) Assignees: TE Connectivity Solutions GmbH, Schaffhausen (CH); Tyco Electronics (Shanghai) Co., Ltd., Shanghai (CN)

( * ) Notice: Subject to any disclaimer, the term of this patent is extended or adjusted under 35 U.S.C. 154(b) by 226 days.

(21) Appl. No.: 17/361,579

(22) Filed: Jun. 29, 2021

(65) Prior Publication Data

US 2021/0404857 A1   Dec. 30, 2021

(30) Foreign Application Priority Data

Jun. 30, 2020  (CN) .......................... 202010621632.5

(51) Int. Cl.
  *G01F 23/292*    (2006.01)
(52) U.S. Cl.
  CPC .............................. *G01F 23/2927* (2013.01)
(58) Field of Classification Search
  CPC ...... G01F 23/2927; G01F 23/27; G01F 23/80; G01D 21/02; G01D 11/245; G01D 11/26; G01K 1/02; G01N 15/06; G01N 2015/0693
  USPC .......................................... 73/64.56, 290 R
  See application file for complete search history.

(56) References Cited

U.S. PATENT DOCUMENTS

| | | | | |
|---|---|---|---|---|
| 5,446,531 | A | * 8/1995 | Boyer | ................. A47L 15/4287 68/12.02 |
| 9,211,838 | B2 | 12/2015 | Aoki | |
| 2011/0273714 | A1* | 11/2011 | Pimputkar | .............. D06F 34/22 356/442 |

FOREIGN PATENT DOCUMENTS

| | | |
|---|---|---|
| CN | 202433117 U | 9/2012 |
| CN | 103269907 A | 8/2013 |
| CN | 107440656 A | 12/2017 |
| CN | 111060158 A | 4/2020 |
| CN | 210294079 U | 4/2020 |

OTHER PUBLICATIONS

First Chinese Office Action dated Sep. 28, 2023 with English translation, corresponding to Application No. 202010621632.5, 20 pages.

* cited by examiner

*Primary Examiner* — Alexander A Mercado
*Assistant Examiner* — Rodney T Frank
(74) *Attorney, Agent, or Firm* — Barley Snyder

(57) ABSTRACT

A sensor assembly includes a housing including a cavity allowing a liquid to flow thereinto, a liquid level sensing module installed on the housing and configured to sense information related to a liquid level when the liquid is flowing into the cavity, and a turbidity sensing module installed on the housing. The turbidity sensing module includes a light emitting unit and a light receiving unit. The light emitting unit and the light receiving unit are located oppositely on an outer surface of the housing to allow a light emitted from the light emitting unit to pass through the cavity of the housing and be received by the light receiving unit.

18 Claims, 3 Drawing Sheets

SENSOR ASSEMBLY

CROSS-REFERENCE TO RELATED APPLICATIONS

This application claims the benefit of the filing date under 35 U.S.C. § 119(a)-(d) of Chinese Patent Application No. 202010621632.5, filed on Jun. 30, 2020.

FIELD OF THE INVENTION

The present invention relates to a sensor and, more particularly, to a sensor assembly.

BACKGROUND

In the prior art, some smart cleaning devices (for example, washing machines or dishwashers) are provided with liquid level sensors, turbidity sensors and temperature sensors that are independently installed in different positions. The liquid level sensors are fixed near the liquid flow paths and used to detect the heights of the liquid level, the measuring portions of the turbidity sensors are inserted into the liquid flow paths to detect the turbidity conditions of the liquid, and the temperature sensors need to be fixed in the liquid flow paths to detect the temperatures of the liquid. These sensors are respectively connected to the control system through different wirings. The cleaning modes of the smart cleaning devices are set automatically by the control system according to the measurements of these three sensors. However, the way that each sensor is installed in a different position independently makes the wiring more complicated and takes up space.

SUMMARY

A sensor assembly includes a housing including a cavity allowing a liquid to flow thereinto, a liquid level sensing module installed on the housing and configured to sense information related to a liquid level when the liquid is flowing into the cavity, and a turbidity sensing module installed on the housing. The turbidity sensing module includes a light emitting unit and a light receiving unit. The light emitting unit and the light receiving unit are located oppositely on an outer surface of the housing to allow a light emitted from the light emitting unit to pass through the cavity of the housing and be received by the light receiving unit.

BRIEF DESCRIPTION OF THE DRAWINGS

The invention will now be described by way of example with reference to the accompanying Figures, of which.

DETAILED DESCRIPTION OF THE EMBODIMENTS

Figure 1:
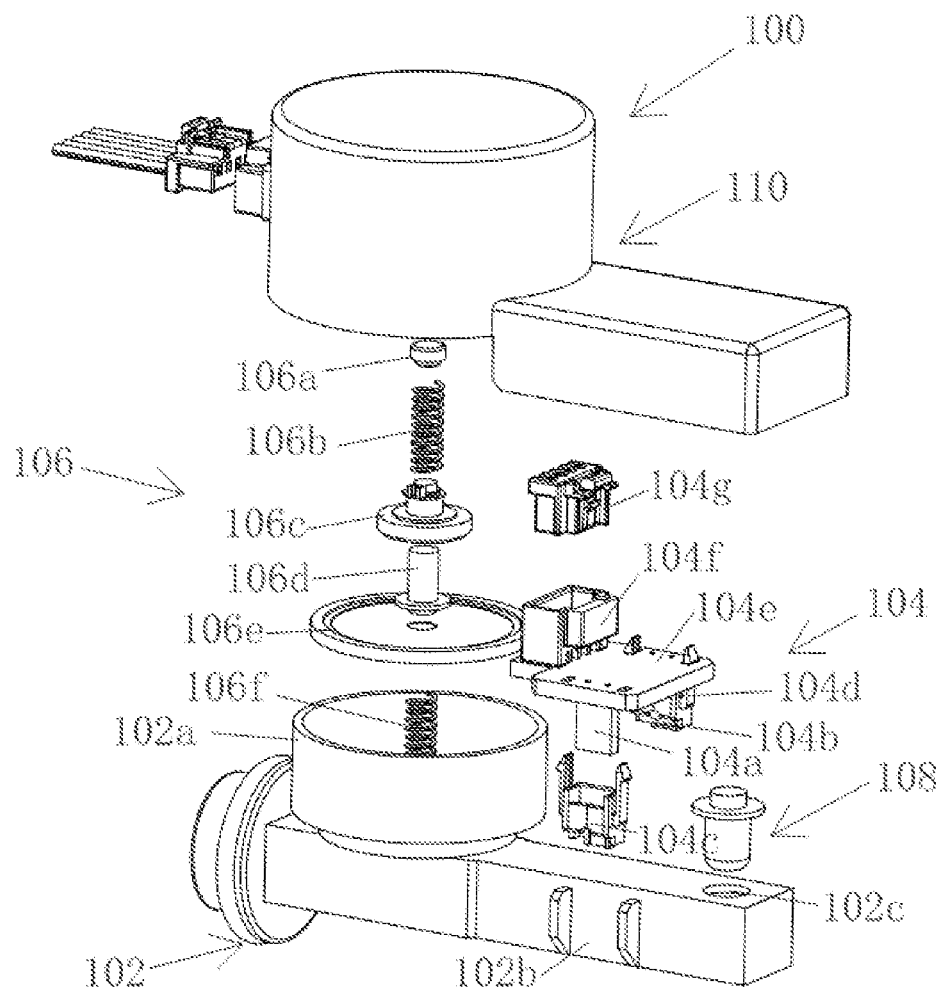
FIG. 1 is an exploded front perspective view of a sensor assembly according to an embodiment.

In the detailed description of the embodiments that follow, reference is made to the accompanying drawings that form a part of the invention. The accompanying drawings illustrate, by way of example, specific embodiments that can implement the invention. The exemplary embodiments are not intended to be exhaustive of all embodiments in accordance with the invention. In the description, the same or similar reference numerals represent the same or similar components. It is to be understood that other embodiments may be utilized and structural or logical modifications may be made without departing from the scope of the invention. Therefore, the following detailed description is not to be considered as limiting. The scope of the invention is defined by the claims.

The terms "including", "comprising", and the like, as used herein, are understood to be open terms, that is, "include/comprise, but not limited to," meaning that other items may also be included. The term "based on" means "based at least in part on." The term "one embodiment" means "at least one embodiment"; the term "another embodiment" means "at least one additional embodiment", and the like.

The front, back, left, right, up, down, front end, rear end, left end, right end, upper portion, lower portion, etc. in the present invention are all relative concepts used with reference to FIG. 1.

The embodiments of the present invention will be described in detail below with reference to the accompanying drawings.

Figure 2:
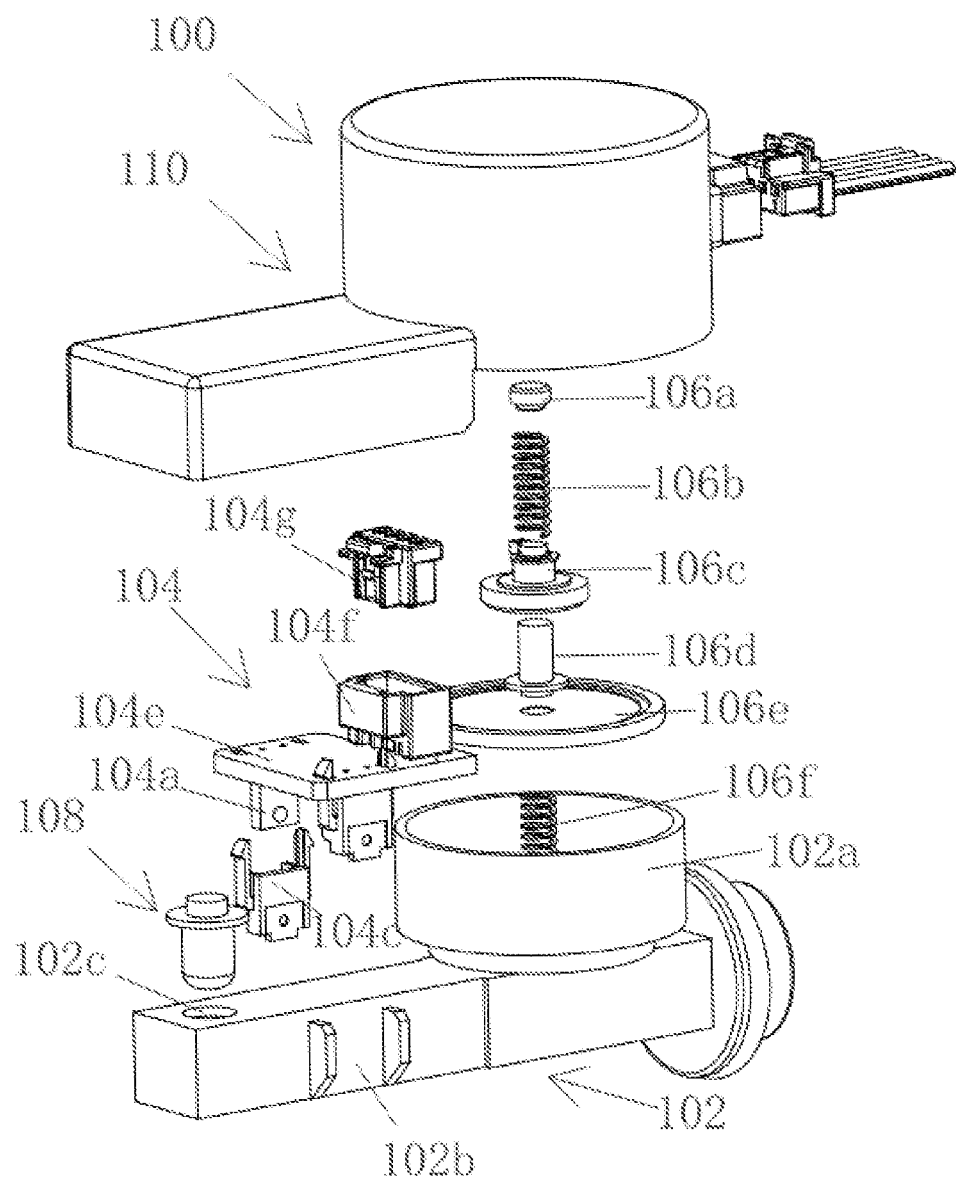
FIG. 2 is an exploded rear perspective view of the sensor assembly of FIG. 1.
Figure 3:
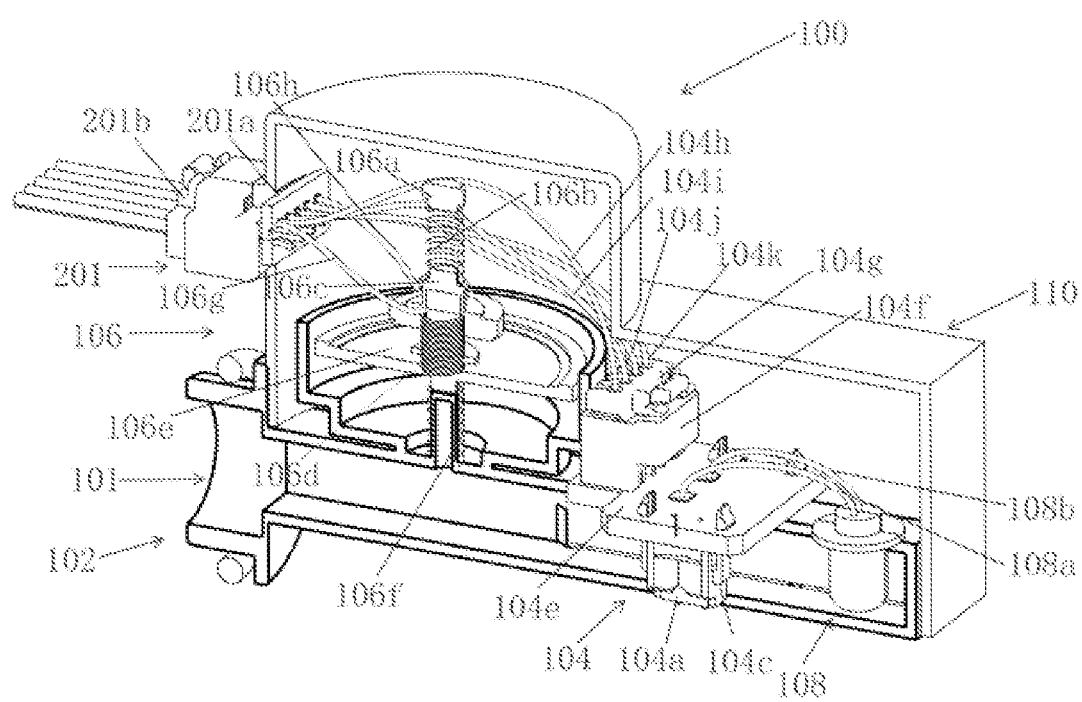
FIG. 3 is a sectional perspective view of the sensor assembly of FIG. 1 after being assembled.

A sensor assembly 100 according to an embodiment of the present invention, shown in FIGS. 1 to 3, is used to detect the liquid level, the liquid turbidity and the temperature in a household appliance, such as a washing machine or a dishwasher. The sensor assembly 100 includes a housing 102, a turbidity sensing module 104, a liquid level sensing module 106, a temperature sensing module 108, and an enclosure 110.

As shown in FIGS. 1 to 3, the housing 102 includes a cavity 101 allowing liquid to flow thereinto. The housing 102 further includes a receiving portion 102a located on the upper surface of the housing 102 and a mounting portion 102b disposed on the outer surface of the housing 102. The mounting portion 102b is used to secure the turbidity sensing module 104. At least a portion of the housing 102 is transparent. The enclosure 110 is sized to shield the turbidity sensing module 104, the liquid level sensing module 106, and the temperature sensing module 108, and cover at least a portion of the housing 102 to exert the waterproof function, the dustproof function, etc.

The turbidity sensing module 104, shown in FIGS. 1 to 3, is used to sense turbidity related information. The turbidity sensing module 104 includes a light emitting unit 104a and a light receiving unit 104b. With a portion of the housing 102 being transparent, when the turbidity sensing module 104 is installed on the housing 102 through the mounting portion 102b, the light emitting unit 104a and the light receiving unit 104b are located on the outer surface of the transparent portion of the housing 102 opposite to each other, to allow the light emitted from the light emitting unit 104a to pass through the surface of the transparent portion and to be able to be received by the light receiving unit 104b. With the housing 102 being fully transparent, when the turbidity sensing module 104 is installed on the housing 102 through the mounting portion 102b, the light emitting unit 104a and the light receiving unit 104b are located on the transparent outer surface of the housing 102 opposite to each other, to allow the light emitted from the light emitting unit 104a to pass through the surface of the housing 102 and be able to be received by the light receiving unit 104b. It should be understood that, in another embodiment, the housing 102 may be opaque and the housing 102 includes an opening penetrating through the housing 102, and when the turbidity sensing module 104 is installed on the housing 102 through the mounting portion 102b, the light emitting unit 104a and the light receiving unit 104b are sealed and installed oppositely at the opening to allow the light emitted from the light emitting unit 104a to pass through the opening and to be able to be received by the light receiving unit 104b.

As also shown in FIG. 1, the turbidity sensing module 104 further includes a first protective casing 104c and a second protective casing 104d, which are used to accommodate the light emitting unit 104a and the light receiving unit 104b separately. When the turbidity sensing module 104 is installed on the housing 102 through the mounting portion 102b, the first protective casing 104c and the second protective casing 104d are secured to the outer surface of the transparent portion of the housing 102. Here, the mounting portions 102b may be mounting rails symmetrically arranged on both sides of the housing 102, so that the first protective casing 104c and the second protective casing 104d can be secured to the housing 102 by a snap connection or a threaded connection, for example. In another embodiment, the housing 102 may not include a mounting portion 102b, and the first protective casing 104c and the second protective casing 104d are directly secured to the outer surface of the housing 102 by ultrasonic welding or the like.

In addition, the turbidity sensing module 104 also includes a signal conversion unit such as a PCB (Printed Circuit Board) assembly 104e shown in FIGS. 1-3. As shown in FIGS. 1-3, the signal conversion unit 104e is coupled to the light emitting unit 104a and the light receiving unit 104b to convert an intensity signal of the light received by the light receiving unit 104b into an analog voltage signal representing turbidity. Moreover, the turbidity sensing module 104 further includes a slot 104f and a first connector 104g used in conjunction with the slot 104f, the analog voltage signal representing the turbidity obtained by the signal conversion unit 104e is transmitted by the first connector 104g. The slot 104f is coupled to the signal conversion unit 104e.

In addition, in another embodiment, the turbidity sensing module 104 may not include the first protective casing 104c and the second protective casing 104d, and the mounting portion 102b is a component with slots disposed on both sides of the housing 102 separately, the light emitting unit 104a and the light receiving unit 104b can be directly inserted into the slots, thereby can be secured to the mounting portion 102b. It should also be understood that, in another embodiment, the first and second protective casings 104c and 104d are respectively provided with a first hole and a second hole that is paired with the first hole. When the liquid (for example, water) flows into the cavity 101 of the housing 102, the light emitted by the light emitting unit 104a can pass through the first hole, pass through the housing 102, and be received by the light receiving unit 104b through the second hole.

In another embodiment, the signal conversion unit 104e may be a component capable of converting the intensity signal of the light received by the light receiving unit 104b into a digital signal representing turbidity. In another embodiment, the signal conversion unit 104e may be integrated into the light receiving unit 104b, so that the light receiving unit 104b receives the light intensity signal and then converts the light intensity signal into turbidity related information through the signal conversion unit 104e integrated in the light receiving unit 104b.

In the embodiment shown in FIGS. 1-3, the liquid level sensing module 106 is used to sense the information related to the liquid level. The liquid level sensing module 106 includes, for example, a calibrator 106a, a spring 106b, a winding 106c, a magnet core 106d, a diaphragm 106e, and a spring 106f, thereby converting the liquid pressure into an analog frequency signal representing the height of the liquid level through the formed LC oscillation circuit.

As shown in FIG. 3, at least a portion of the liquid level sensing module 106 is accommodated in the receiving portion 102a of the housing 102. In this embodiment, the liquid level sensing module 106 uses analog output to provide the detected height of the liquid level. It should be understood that, in another embodiment, the liquid level sensing module 106 may use MEMS digital output to provide the detected height of the liquid level, the structure of the receiving portion 102a of the housing 102 and the structure of the enclosure 110 need to be adjusted accordingly.

In the embodiment shown in FIGS. 1-3, the sensor assembly 100 further includes a temperature sensing module 108, the housing 102 further includes a receiving portion 102c, and the temperature sensing module 108 is at least partially received in the receiving portion 102c and makes contact with the liquid entering the cavity 101 of the housing 102, thereby detecting the temperature related information of the liquid. In this embodiment, the temperature sensing module 108 is an analog sensing module, which outputs an analog resistance value. In another embodiment, the temperature sensing module 108 outputs a digital signal characterizing a temperature of the liquid.

FIG. 3 shows the state of the sensor assembly 100 after the turbidity sensing module 104, the liquid level sensing module 106, and the temperature sensing module 108 have been assembled. As shown in FIG. 3, a third ground wire 108a and a third signal wire 108b of the temperature sensing module 108 are respectively soldered to the PCB assembly 104e, and the first connector 104g of the turbidity sensing module 104 is connected with four wires (that is, a second ground wire 104h, a power wire 104i (such as a 5v power wire), a second signal wire 104j that outputs a turbidity signal, and a signal output line 104k that outputs a temperature signal) to form a four-bit output, where the second ground wire 104h and the third ground wire 108a share a common ground. The other ends of the four wires are respectively soldered to a PCB assembly 201a of a second connector 201 mounted on the enclosure 110, and a first ground wire 106g and a first signal wire 106h of the liquid level sensing module 106 are also soldered to the PCB assembly 201a of the second connector 201, wherein the first ground wire 106g and the second ground wire 104h share a common ground, so that the second connector 201 forms a five-bit output. The other side of the second connector 201 opposite to the PCB assembly 201a is soldered with the SGI (Signal grace inertia) connector socket 201b for outputting the signal sensed by sensor assembly 100 (for example, outputting to an external controller, etc.). It should be understood that the number of output bits of the first connector 104g and the second connector 201 can be adjusted as required.

It should be understood that, in another embodiment, the temperature sensing module 108 may be a digital sensing module, which outputs a digital signal. Although in the embodiment shown in FIGS. 1-3 the housing 102 includes the receiving portion 102c, in another embodiment, the housing 102 may not include the receiving portion 102c, and the sensor assembly 100 may only include the turbidity sensing module 104 and the liquid level sensing module 106 and not include the temperature sensing module 108.

Compared with existing sensors, the sensor assembly 100 is more compact in structure and saves space, improves wiring and installation efficiency, and improves product reliability.

It is to be noted that the embodiments described above are only specific embodiments of the disclosure; the disclosure is not limited to the embodiments above, and there are many similar variations. All modifications that are directly derived or associated by those of ordinary skill in the art should fall within the scope of the invention.

What is claimed is:

1. A sensor assembly for a household appliance containing a liquid, comprising: a housing attached to the appliance, the housing including a cavity for receiving a volume of the liquid from the appliance; a liquid level sensing module installed on the housing and configured to sense information related to a liquid level from the volume of the liquid in the cavity via contact with the liquid; a turbidity sensing module installed on the housing, the turbidity sensing module including a light emitting unit and a light receiving unit, the light emitting unit and the light receiving unit located oppositely, each respectively mounted on an outer surface of the housing and configured to allow a light emitted from the light emitting unit to pass through the housing and into the cavity of the housing and be received by the light receiving unit, the turbidity sensing module has a first connector transmitting a turbidity related information and the liquid level sensing module is connected to a second connector sending information sensed in the sensor assembly to an external controller, the first connector is connected to the second connector; a temperature sensing module installed on the housing, the temperature sensing module at least partially accommodated in the cavity of the housing and contacted by the volume of the liquid within the cavity; and an enclosure accommodating the liquid level sensing module, the turbidity sensing module, and the temperature sensing module, the turbidity sensing module includes a signal conversion unit that is a first printed circuit board assembly positioned within the enclosure and mounted on the housing, the temperature sensing module is connected by a signal wire to the first printed circuit board assembly, the first connector is positioned within the enclosure and is connected to the first printed circuit board assembly, the second connector is mounted on the enclosure and has a second printed circuit board assembly positioned within the enclosure, the turbidity related information is transmitted from the first connector through the second connector to the external controller.

2. The sensor assembly of claim 1, wherein the housing has a transparent portion, the light emitting unit and the light receiving unit are located oppositely on the outer surface of the housing at the transparent portion to allow the light emitted from the light emitting unit to pass through a surface of the transparent portion and be received by the light receiving unit.

3. The sensor assembly of claim 1, wherein the housing is fully transparent, the light emitting unit and the light receiving unit are located oppositely on the outer surface of the housing to allow the light emitted from the light emitting unit to pass through a surface of the housing and be received by the light receiving unit.

4. The sensor assembly of claim 1, wherein the housing has an opening penetrating through the housing, and when the turbidity sensing module is installed on the housing, the light emitting unit and the light receiving unit are sealed and installed oppositely at the opening to allow the light emitted from the light emitting unit to pass through the opening and be received by the light receiving unit.

5. The sensor assembly of claim 1, wherein the turbidity sensing module includes a first protective casing and a second protective casing, the light emitting unit is accommodated in the first protective casing and the light receiving unit is accommodated in the second protective casing.

6. The sensor assembly of claim 5, wherein the first protective casing and the second protective casing are secured to the outer surface of the housing.

7. The sensor assembly of claim 6, wherein the first protective casing and the second protective casing are secured to the outer surface of the housing through a snap connection, a threaded connection, or an ultrasonic welding.

8. The sensor assembly of claim 1, wherein the signal conversion unit converts an intensity signal of the light received by the light receiving unit into the turbidity related information.

9. The sensor assembly of claim 8, wherein the turbidity sensing module includes a slot and the first connector used in conjunction with the slot, the slot is coupled to the signal conversion unit.

10. The sensor assembly of claim 9, wherein the liquid level sensing module is connected to the second connector through a first signal wire and a first ground wire.

11. The sensor assembly of claim 10, wherein the turbidity sensing module realizes the connection between the first connector and the second connector through a power wire, a second signal wire, and a second ground wire, the first ground wire and the second ground wire share a common ground.

12. The sensor assembly of claim 10, wherein a first end of the second connector connected to the first connector is the second printed circuit board assembly, and a second end of the second connector is an SGI connector socket.

13. The sensor assembly of claim 8, wherein the turbidity related information is an analog voltage signal or a digital signal that characterizes a turbidity of the liquid.

14. The sensor assembly of claim 11, wherein the temperature sensing module is connected to the signal conversion unit through the signal wire that is a third signal wire and a third ground wire, and a signal output line for transmitting the temperature related information extends between the second connector and the first connector, and wherein the third ground wire and a second ground wire share a common ground.

15. The sensor assembly of claim 1, wherein the information related to the liquid level is an analog frequency signal or a digital signal that characterizes a height of the liquid.

16. The sensor assembly of claim 1, wherein the temperature related information is an analog resistance value or a digital signal that characterizes a temperature of the liquid.

17. The sensor assembly of claim 1, wherein the liquid level sensing module includes at least one spring, a winding, a magnetic core, and a diaphragm to convert a pressure of the liquid into an analog frequency signal representing the liquid level.

18. A sensor assembly connected to a household appliance containing a liquid, comprising:
   a housing attached to the appliance and communicating with the liquid, the housing including a closed cavity forming a conduit in communication with the liquid;
   a liquid level sensor installed on the housing and in contact with the liquid in the cavity;
   a turbidity sensor installed on the housing, including a light emitting unit and a light receiving unit, each respectively mounted on an outer surface of the housing and configured to allow light emitted from the light emitting unit to pass through the housing and into the cavity of the housing and be received by the light receiving unit, the turbidity sensor has a first connector transmitting a turbidity related information and the liquid level sensor is connected to a second connector sending information sensed in the sensor assembly to an external controller, the first connector is connected to the second connector;

a temperature sensor installed on the housing, the temperature sensing module at least partially accommodated in the cavity of the housing and in contact with the liquid in the cavity; and an enclosure accommodating the liquid level sensor, the turbidity sensor, and the temperature sensor, the turbidity sensor includes a signal conversion unit that is a printed circuit board assembly positioned within the enclosure and mounted on the housing, the temperature sensor is connected by a signal wire to the printed circuit board assembly, the first connector is positioned within the enclosure and is connected to the printed circuit board assembly, the second connector is mounted on the enclosure and has a second printed circuit board assembly positioned within the enclosure, the turbidity related information is transmitted from the first connector through the second connector to the external controller.

* * * * *